US007784809B2

(12) United States Patent
Heyl et al.

(10) Patent No.: US 7,784,809 B2
(45) Date of Patent: Aug. 31, 2010

(54) MOTORCYCLE HAVING A FRONT WHEEL SUSPENSION

(75) Inventors: Gerrit Heyl, Gauting (DE); Josef Seidl, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 12/189,605

(22) Filed: Aug. 11, 2008

(65) Prior Publication Data

US 2008/0296863 A1     Dec. 4, 2008

Related U.S. Application Data

(63) Continuation of application No. PCT/EP2007/002626, filed on Mar. 24, 2007.

(30) Foreign Application Priority Data

Apr. 6, 2006   (DE)   ........................ 10 2006 016 183

(51) Int. Cl.
   *B62K 25/08*   (2006.01)
(52) U.S. Cl. ...................................... 280/276
(58) Field of Classification Search ................ 280/276, 280/277; 180/219
   See application file for complete search history.

(56) References Cited

U.S. PATENT DOCUMENTS

| | | | | |
|---|---|---|---|---|
| 3,549,167 A | | 12/1970 | Haverbeck | |
| 4,082,307 A | * | 4/1978 | Tait | 280/277 |
| 4,179,135 A | * | 12/1979 | Slater | 280/276 |
| 4,756,547 A | * | 7/1988 | Trema | 280/276 |
| 4,834,412 A | * | 5/1989 | Trema | 280/276 |
| 5,361,864 A | * | 11/1994 | Tanaka | 180/219 |
| 5,813,684 A | * | 9/1998 | Baron | 280/276 |
| 6,349,784 B1 | * | 2/2002 | van der Heide | 180/219 |
| 7,140,627 B2 | * | 11/2006 | Wimmer | 280/276 |

FOREIGN PATENT DOCUMENTS

| | | |
|---|---|---|
| DE | 37 08 579 A1 | 9/1988 |
| DE | 90 13 180.0 U1 | 11/1991 |
| DE | 199 55 645 A1 | 5/2001 |
| DE | 102 45 983 A1 | 4/2004 |
| DE | 10 2004 033 622 A1 | 2/2006 |
| EP | 507088 A1 * | 10/1992 |
| FR | 8 71 270 | 4/1942 |

OTHER PUBLICATIONS

German Search Report dated Dec. 12, 2006 with English translation (Nine (9) pages).
International Search Report dated Jun. 22, 2007 with English translation of relevant portion (Three (3) pages).

* cited by examiner

*Primary Examiner*—Kevin Hurley
(74) *Attorney, Agent, or Firm*—Crowell & Moring LLP

(57) ABSTRACT

A motorcycle having a forked front wheel support with two rigid fork arms on which a front wheel of the motorcycle is mounted, an upper trailing link provided for supporting wheel support forces connected via an upper joint to an upper area of the wheel support, and lower trailing link provided for supporting wheel support forces situated below the upper trailing link and connected via a lower joint to the lower trailing link, in which at least one of the two joints is elastically connected to its respective upper or lower trailing link and/or to the wheel support.

10 Claims, 6 Drawing Sheets

MOTORCYCLE HAVING A FRONT WHEEL SUSPENSION

CROSS-REFERENCE TO RELATED APPLICATIONS

This application is a continuation of PCT/EP2007/002626, filed Mar. 24, 2007, which claims priority under 35 U.S.C. §119 to German Application No. 10 2006 016 183.1, filed Apr. 6, 2006, the disclosure of which is expressly incorporated by reference herein.

BACKGROUND AND SUMMARY OF THE INVENTION

The present invention relates to a motorcycle having a front wheel suspension with a forked wheel support connected by at least one trailing link to the motorcycle frame.

The motorcycle "K 1200 S" from BMW has a front wheel suspension which is known under the name "Duolever." Viewed kinematically, the Duolever front wheel suspension is a jointed rectangle, which is formed by two trailing links situated one above another and each mounted so it is pivotable on the frame or on an engine housing. The front ends of the trailing links are each connected via a ball-and-socket joint to a forked wheel support, which is produced in the K 1200 S in one piece from aluminum chill casting. The springing and damping is assumed by a suspension strut, which is linked to the lower of the two trailing links and is supported against the frame. A trapezoidal scissors joint mounted on the "control head" and wheel support is coupled to the control arm and transmits the steering movements input via the handlebars to the wheel support.

The object of the invention is to provide a motorcycle having a front wheel suspension, in particular a "Duolever front wheel suspension" or a "Telelever front wheel suspension," which offers still better driving comfort in particular in regard to "impact forces" introduced into the wheel support via the front wheel as occur when driving over obstacles, for example.

The starting point of the invention is a motorcycle having a front wheel suspension, in particular a "Duolever front wheel suspension." Although the invention is predominately described in the following on the basis of a Duolever front wheel suspension, it is to be expressly noted that the invention is also applicable in the so-called Telelever front wheel suspension which has been known for some time from BMW motorcycles, which is distinguished by a telescoping fork, whose lower fork tubes are supported in an articulated manner via a trailing link on the frame or the engine housing of the motorcycle.

A Duolever front wheel suspension has a forked wheel support having two rigid fork arms, on which a front wheel of the motorcycle is mounted. The wheel support may be an aluminum cast part, for example. The wheel support is suspended on the motorcycle using two pivotable trailing links situated one above another. The rear ends of the trailing links may be connected via pivot joints, for example, to the frame and/or to the engine housing of the motorcycle. The trailing links are provided for absorbing forces introduced via the front wheel into the wheel support and allow the wheel support to spring in and out. Each of the two trailing links may have two arms whose rear ends are pivotably connected on the left or right side of the motorcycle to the motorcycle frame or to the engine housing. The two arms of each of the two trailing links run together toward the front and are each connected there via a ball-and-socket joint to the wheel support.

In the case of a Duolever front wheel suspension, the core of the invention is that at least one of the two joints is elastically connected to the assigned trailing link and/or to the wheel support. In this context, the term "elastically" means that impacts introduced primarily in the travel direction via the front wheel into the wheel support, e.g., when driving over obstacles, may be "cushioned" to a certain extent, i.e., not introduced completely unsprung from the wheel support via the joints into the trailing links and further into the motorcycle frame and/or the engine housing.

Accordingly, in the case of a Telelever front wheel suspension, the core of the invention is that the ball-and-socket joint via which the trailing link—the single one provided here—is connected to the fork bridge connecting the lower of the fork tubes of the telescopic fork, is elastically connected to the trailing link and/or to the assigned fork bridge. A motorcycle having "Telelever front wheel suspension" according to the invention thus has at least the following features:

a telescopic fork having two upper fork tubes and two lower fork tubes displaceable in relation thereto, a fork bridge which connects the two lower fork tubes to one another, a trailing link having a front end viewed in the travel direction which is connected via a joint (20) to the fork bridge, the joint being connected elastically to the trailing link and/or to the fork bridge.

It is to be expressly noted that all of the features or feature combinations described in the following which relate to the elastic attachment of the ball-and-socket joint(s) in the Duolever to the assigned trailing links and/or to the wheel support may also be applicable in a constructively identical way to the elastic attachment of the ball-and-socket joint of a Telelever front wheel suspension, in which, as described above, the fork bridge connecting the lower fork tubes is connected via a ball-and-socket joint to a trailing link, which is in turn connected in an articulated manner to the frame and/or to the engine housing of the motorcycle.

In a Duolever front wheel suspension, at least the joint via which the upper trailing link is connected to the wheel support is preferably elastically "attached." As already noted, a component connection which is elastically formed appropriately in the longitudinal direction of the motorcycle may alternately be provided between the joint(s) and the wheel support and/or between the joint(s) and the particular assigned trailing link.

A longitudinal elasticity of this type may be achieved using a spring plate, for example. Elastomer elements may be used alternatively or additionally thereto.

Other objects, advantages and novel features of the present invention will become apparent from the following detailed description when considered in conjunction with the accompanying drawings.

DETAILED DESCRIPTION

Figure 1:
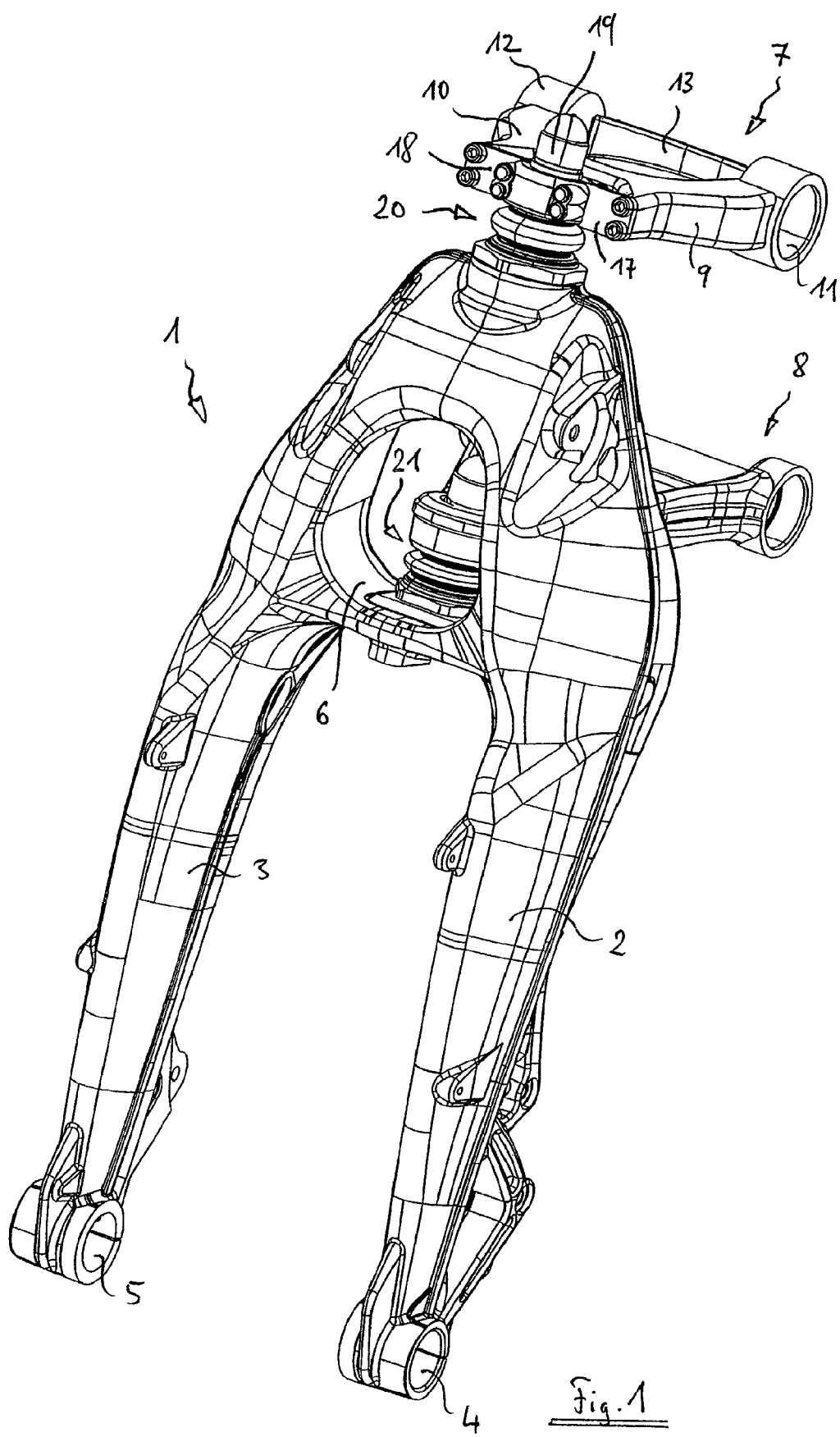
FIG. 1 shows a perspective illustration of a front wheel suspension according to the Duolever principle in accordance with an embodiment of the present invention.

FIG. 1 shows a front wheel suspension for motorcycles according to the so-called "Duolever principle." A front wheel suspension of this type has a forked front wheel support 1, which may be produced in the form of a cast part from an aluminum alloy, for example. The front wheel support 1 has the shape of a fork having a left fork rod 2 and a right fork rod 3, on whose lower ends bearing eyes 4, 5 are provided for receiving an axle of a front wheel (not shown). The two fork rods 2, 3 are connected to one another by a web 6 in the upper third of the front wheel support 1. The upper ends of the fork rods 2, 3 run together and are connected to one another in one piece. The front wheel support 1 is mounted on a frame of the motorcycle (not shown here) so it is pivotable using an upper trailing link 7 and using a lower trailing link 8. The upper trailing link 7 has a left trailing link arm 9 and a right trailing link arm 10, on whose rear ends a bearing eye 11 and 12, respectively, is provided. The two bearing eyes are connected to one another via a rear cross web 13. The upper trailing link 7 is mounted so it is pivotable on the frame (not shown) of the motorcycle at the bearing eyes 11, 12.

Figure 2:
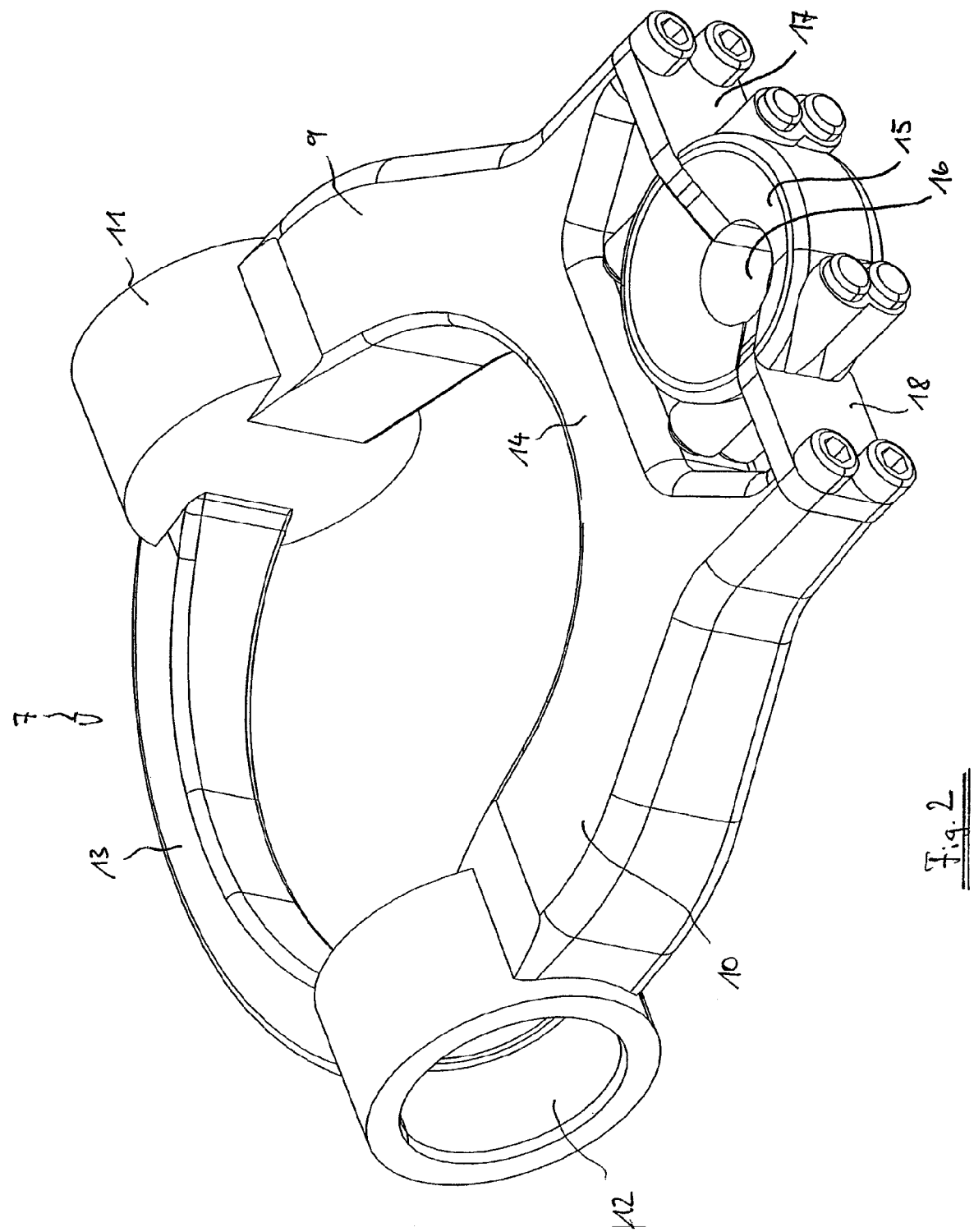
FIG. 2 shows the upper trailing link of FIG. 1, whose ball-and-socket joint receptacle is connected longitudinally-elastic to the trailing link in accordance with an embodiment of the present invention.

As is obvious from FIG. 1 or 2, the two trailing link arms 9, 10 of the upper trailing link 7 run together in front and are connected to one another by a front cross web 14. The two trailing link arms 9, 10 extend somewhat forward in front of the front cross web 14, which may be seen best in FIG. 2. A joint receptacle element 15 having a through hole 16 is provided in the area between the front ends of the trailing link arms 9, 10. The joint receptacle element 15 has a slot in each case on its left and its right side, in which a left or right spring element 17, 18 like a leaf spring is inserted. The elements like leaf springs are screwed together with the assigned trailing link arm 9 or 10 and the joint receptacle element 15.

As may be seen best from FIG. 2, the elements 17, 18 like leaf springs are situated so that their main plane, i.e., in FIG. 2 their front side, is essentially perpendicular to the ends of the trailing link arms 9, 10 or parallel to a transverse axis through the two bearing eyes 11, 12 of the upper trailing link 7. The joint receptacle element 15 is thus connected to the upper trailing link 7 relatively rigidly in a transverse direction, i.e., parallel to a transverse axis through the bearing eyes 11, 12. The joint receptacle element 15 is also connected relatively rigidly to the upper trailing link 7 in the direction of the longitudinal axis of the through hole 16.

In contrast, a certain elasticity is ensured in the longitudinal direction of the motorcycle and/or in the longitudinal direction of the trailing link arms 9, 10 by the elements 17, 18 like leaf springs. To a certain extent, the joint receptacle element 15 may thus be displaced in the direction of the longitudinal direction of the trailing link arms 9, 10. To a certain extent, twisting of the joint receptacle element 15 around a transverse axis which is parallel to a transverse axis to the bearing eyes 11, 12 in relation to the upper trailing link 7 is also possible.

As is obvious from FIG. 1, a bearing pin of an upper ball-and-socket joint 20 is inserted in the joint receptacle element 15. The upper area of the wheel support 1 is connected in an articulated manner to the upper trailing link 7 via the upper ball-and-socket joint 20.

The lower trailing link 8, which is only partially shown in FIG. 1, may be designed essentially identically to the upper trailing link 7. In the front area, the lower trailing link 8 is connected in an articulated manner via a ball-and-socket joint 21 to the wheel support 1 or more precisely to the transverse web 6 of the wheel support 1.

Figure 3:
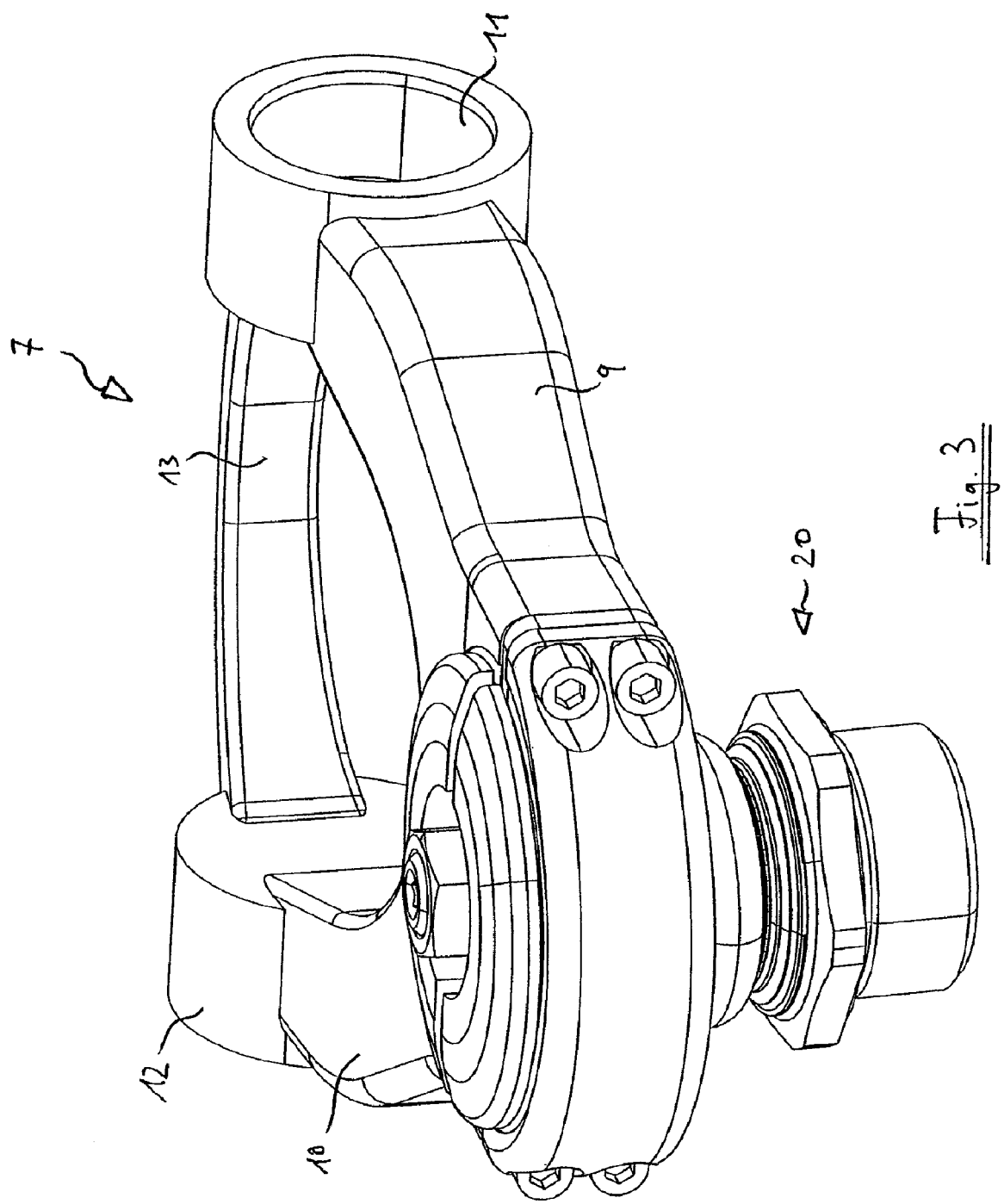
FIG. 3 shows the trailing link of FIG. 2 having inserted ball-and-socket joint.

FIG. 3 shows a detail illustration of the upper trailing link 7 having inserted ball-and-socket joint 20.

Figure 4:
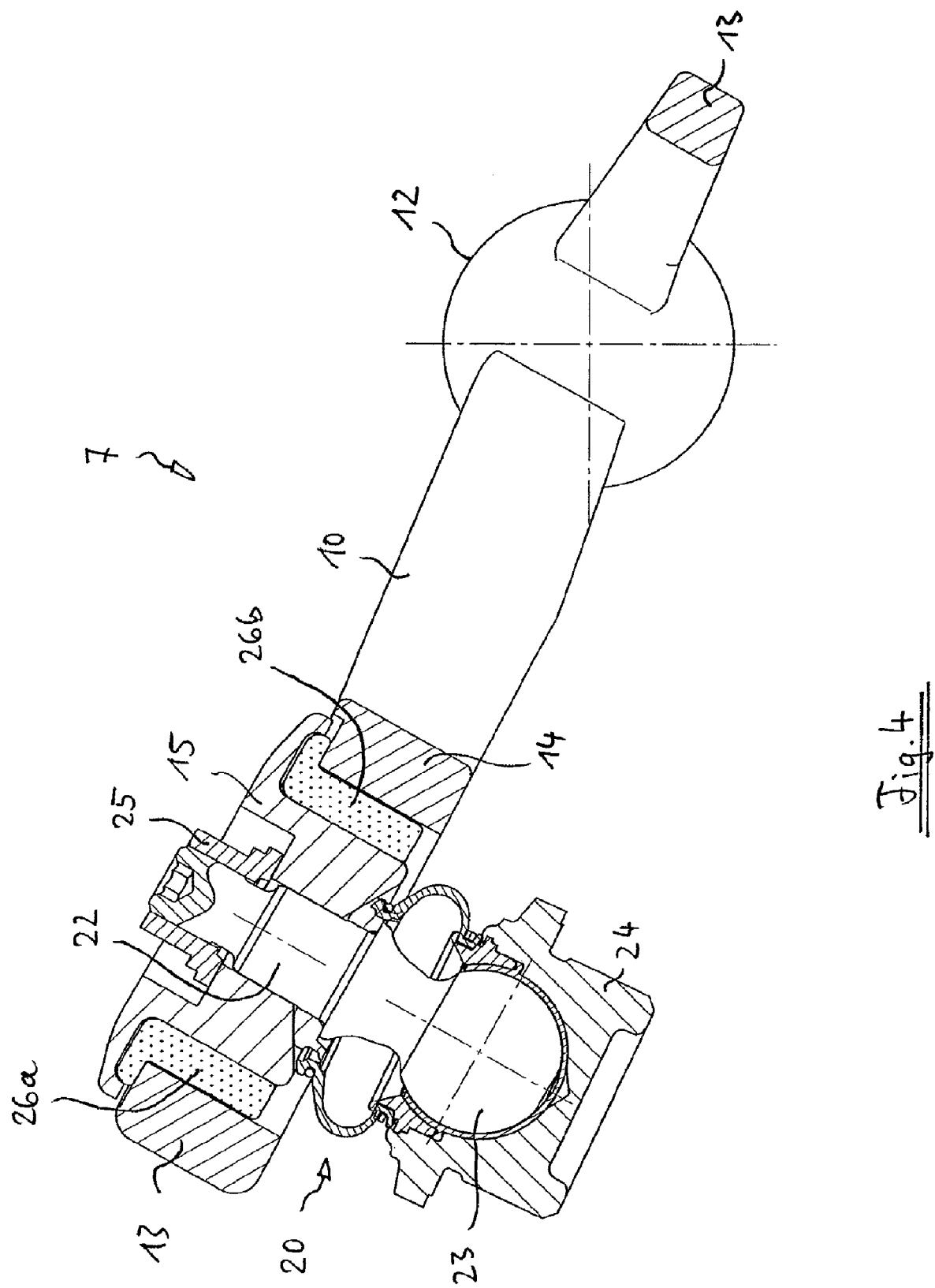
FIG. 4 shows a longitudinal section through the trailing link of FIG. 3.

FIG. 4 shows a longitudinal section through the upper trailing link 7. The ball-and-socket joint 20 may be seen in detail in this illustration. The ball-and-socket joint 20 has a joint pin 22, which is connected to a joint ball 23. The joint ball 23 is in turn inserted in a joint socket 24. The joint socket 24 is screwed into an assigned threaded hole, which is provided in the upper area of the wheel support 1 (FIG. 1).

The joint pin 22 is inserted into the joint receptacle element 15 (cf. also FIG. 2) and secured using a securing nut 25.

The recess formed by the front and rear cross webs 13 and 14 has a "certain excess" in relation to the external circumference of the joint receptacle element. An elastomer 26a, 26b is inserted into the ring gap remaining between them. This may be two elastomer elements in the form of half rings, between which the two elements 17, 18 like leaf springs project out laterally. The elements 17, 18 like leaf springs are then connected to the joint receptacle element 15 corresponding to the exemplary embodiment of FIG. 2.

Figure 5:
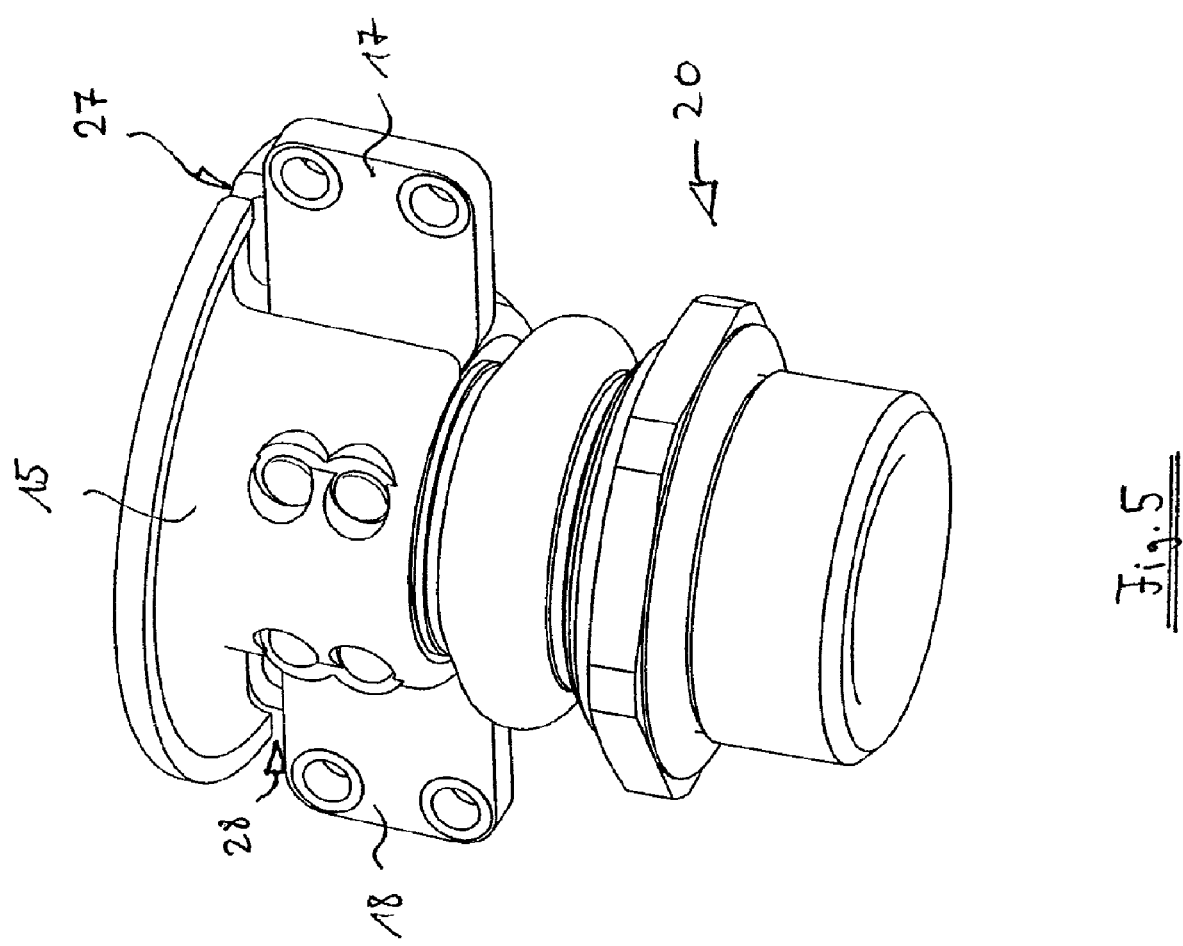
FIG. 5 shows a detail illustration of the joint receptacle having inserted ball-and-socket joint.

FIG. 5 shows a detail illustration of the joint receptacle element 15 having inserted ball-and-socket joint 20. As is obvious from FIG. 5, the joint receptacle element 15 has lateral slots 27, 28, into which the elements 17, 18 like leaf springs are inserted. The elements 17, 18 like leaf springs may be riveted, screwed, or connected in another way to the joint receptacle element.

Figure 6:
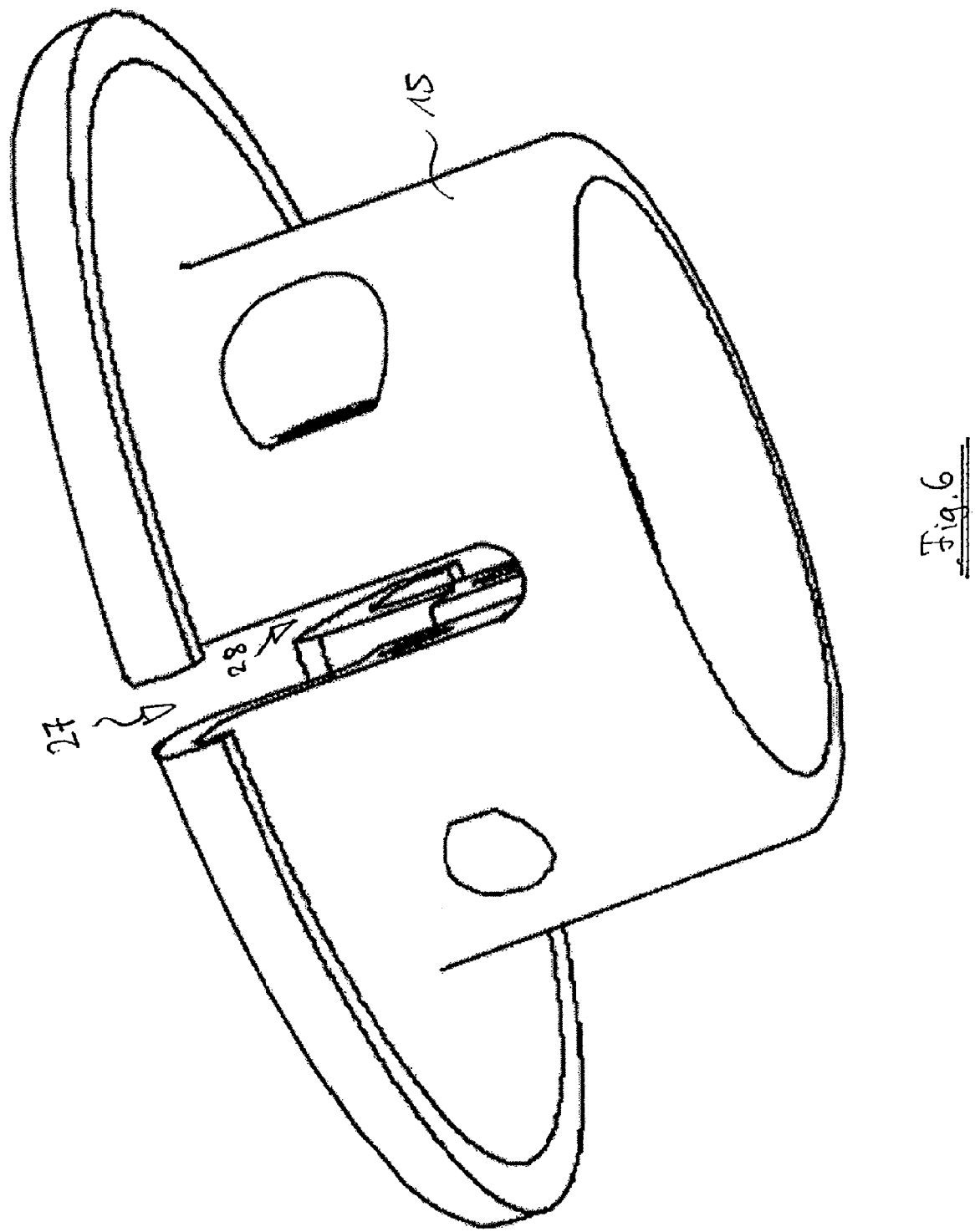
FIG. 6 shows a detail illustration of the joint receptacle.

FIG. 6 shows a detail illustration of the joint receptacle element 15 from the side. The two receptacle slots 27, 28 for receiving the two elements 17, 18 like leaf springs are clearly shown in this illustration.

It is to be expressly noted once again that all of the features relating to the connection of the upper trailing link 7 to the wheel support 1 may also be provided in the connection which connects the lower trailing link 8 to the wheel support.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle having a front wheel guide, comprising:
    a forked wheel support having two rigid fork arms on which a front wheel of the motorcycle is mounted;
    an upper trailing link provided for supporting wheel support forces, the upper trailing link having a front end viewed in a travel direction of the motorcycle and being connected via an upper joint to an upper area of the wheel support; and
    a lower trailing link provided for supporting wheel support forces, the lower trailing link being located below the upper trailing link, having a front end viewed in the travel direction of the motorcycle connected via a lower joint to a lower area of the wheel support,
    wherein at least one of the upper and lower joints is elastically connected to at least one of the respective upper trailing link, lower trailing link and the wheel support.

2. The motorcycle according to claim 1, wherein the at least one of the upper and lower joints is a ball-and-socket joint having a joint pin and a joint ball connected thereto, said joint ball being inserted into a joint socket.

3. The motorcycle according to claim 2, wherein the ball-and-socket joint is elastically connected to at least one of its respective trailing link and to the wheel support on at least one of a joint pin side and a joint socket side.

4. The motorcycle according to claim 2, wherein at least one of the joint pin and the joint socket is inserted or screwed into a joint receptacle, the joint receptacle being elastically connected to its respective trailing link via at least one spring element.

5. The motorcycle according to claim 4, wherein the at least one spring element is elastic in a first direction perpendicular to the joint pin and corresponding essentially to the travel direction of the motorcycle, and is essentially inelastic in directions which are perpendicular to the first direction.

6. The motorcycle according to claim 5, wherein the respective trailing link has two trailing link arms, and the joint receptacle is situated centrally between ends of the two trailing arms.

7. The motorcycle according to claim 5, wherein the joint receptacle is connected via spring plates to the end of the trailing link arms.

8. The motorcycle according to claim 6, wherein the joint receptacle is connected via a first spring plate to the end of one of the two trailing link arms and via a second spring plate to the end of the other of the two trailing link arms.

9. The motorcycle according to claim 8, wherein a plane defined by the spring plates is essentially perpendicular to the ends of the two trailing link arms.

10. The motorcycle according to claim 9, wherein the joint receptacle is inserted into an annular opening of the respective trailing link in the area of the ends of the trailing link arms, an elastomeric element being inserted into a ring gap formed by an external circumference of the joint receptacle and the annular opening.

* * * * *